United States Patent
Sobti et al.

(10) Patent No.: US 12,248,524 B2
(45) Date of Patent: Mar. 11, 2025

(54) SYSTEM, METHOD, AND COMPUTER PROGRAM FOR MONITORING AND OPTIMIZING ENTERPRISE KNOWLEDGE MANAGEMENT PLATFORM USING NON-PERSONALLY-IDENTIFIABLE INFORMATION IN LOGS

(71) Applicant: Glean Technologies, Inc., Palo Alto, CA (US)

(72) Inventors: Sumeet Sobti, Palo Alto, CA (US); Piyush Prahladka, Palo Alto, CA (US); Eddie Zhou, Palo Alto, CA (US); Rui Wu, Palo Alto, CA (US); Arjun Landes, Palo Alto, CA (US); Debarghya Das, Palo Alto, CA (US); Neil Rajesh Dhruva, Palo Alto, CA (US); Shivaal Roy, Palo Alto, CA (US); Mrinal Mohit, Palo Alto, CA (US); Calvin Qi, Palo Alto, CA (US)

(73) Assignee: Glean Technologies, Inc., Palo Alto, CA (US)

( * ) Notice: Subject to any disclaimer, the term of this patent is extended or adjusted under 35 U.S.C. 154(b) by 447 days.

(21) Appl. No.: 17/725,739

(22) Filed: Apr. 21, 2022

(65) Prior Publication Data
US 2023/0342405 A1 Oct. 26, 2023

(51) Int. Cl.
G06F 16/953 (2019.01)
(52) U.S. Cl.
CPC .................. G06F 16/953 (2019.01)

(58) Field of Classification Search
CPC ...................................................... G06F 16/953
See application file for complete search history.

(56) References Cited

U.S. PATENT DOCUMENTS

| | | | |
|---|---|---|---|
| 7,653,611 B2 * | 1/2010 | Zheng | G06Q 10/06 705/7.41 |
| 8,417,715 B1 * | 4/2013 | Bruckhaus | G06Q 10/04 705/26.1 |
| 9,092,802 B1 * | 7/2015 | Akella | G06F 16/36 |
| 9,336,302 B1 * | 5/2016 | Swamy | G06F 16/248 |
| 11,087,087 B1 * | 8/2021 | Mayer | G06F 40/30 |
| 2006/0277190 A1 * | 12/2006 | Fox | G06F 16/284 |
| 2006/0288001 A1 * | 12/2006 | Costa | G06F 16/951 707/999.005 |
| 2007/0033221 A1 * | 2/2007 | Copperman | G06F 16/3338 |

(Continued)

*Primary Examiner* — Mark E Hershley
(74) *Attorney, Agent, or Firm* — Zhong Law, LLC

(57) ABSTRACT

A system and method for monitoring and optimizing work assistant search engines implemented within secured enterprise computing systems include one or more processing devices to receive diagnostic data of a work assistant search engine from a secured enterprise computing system. The one or more processing devices may further determine, by analyzing the diagnostic data, a search quality metric value associated with the feature values and the scores. Responsive to determining that the search quality metric value differs from a target search quality metric value by a predetermined threshold value, the one or more processing devices may further determine an updated score model, and provide the updated score model to the secured enterprise computing system to update the work assistant search engine.

20 Claims, 5 Drawing Sheets

(56) References Cited

U.S. PATENT DOCUMENTS

| | | | | |
|---|---|---|---|---|
| 2008/0215571 A1* | 9/2008 | Huang | G06F 16/345 | 707/999.005 |
| 2010/0121841 A1* | 5/2010 | He | G06F 16/9535 | 707/E17.014 |
| 2011/0276568 A1* | 11/2011 | Fotev | G06F 16/3331 | 707/E17.064 |
| 2013/0204876 A1* | 8/2013 | Szucs | G06F 16/313 | 707/738 |
| 2013/0246430 A1* | 9/2013 | Szucs | G06F 16/313 | 707/738 |
| 2014/0129371 A1* | 5/2014 | Wilson | G06Q 30/0631 | 705/26.7 |
| 2014/0280108 A1* | 9/2014 | Dunn | G06F 16/9535 | 707/728 |
| 2015/0066896 A1* | 3/2015 | Davis | G06F 16/9038 | 707/710 |
| 2016/0026713 A1* | 1/2016 | Katic | G06F 16/28 | 707/723 |
| 2017/0220652 A1* | 8/2017 | Kazi | G06F 16/24578 | |
| 2017/0262899 A1* | 9/2017 | Geraghty | G06Q 30/0277 | |
| 2018/0067945 A1* | 3/2018 | Jain | G06F 16/35 | |
| 2018/0349755 A1* | 12/2018 | Gao | G06N 3/006 | |
| 2019/0005055 A1* | 1/2019 | Andrew | G06F 16/9537 | |
| 2019/0034780 A1* | 1/2019 | Marin | G06F 16/3329 | |
| 2020/0134038 A1* | 4/2020 | Chandra Sekar Rao | G06N 3/08 | |
| 2021/0149899 A1* | 5/2021 | Gutiérrez | G06F 16/252 | |
| 2021/0192412 A1* | 6/2021 | Krishnaswamy | G06Q 10/06375 | |
| 2021/0409330 A1* | 12/2021 | Bolten | H04L 47/11 | |
| 2022/0245161 A1* | 8/2022 | Ahmed | G06N 20/00 | |
| 2022/0309037 A1* | 9/2022 | Gutierrez | G06F 16/16 | |
| 2023/0176070 A1* | 6/2023 | Shi | C07K 16/00 | 435/7.1 |

* cited by examiner

SYSTEM, METHOD, AND COMPUTER PROGRAM FOR MONITORING AND OPTIMIZING ENTERPRISE KNOWLEDGE MANAGEMENT PLATFORM USING NON-PERSONALLY-IDENTIFIABLE INFORMATION IN LOGS

TECHNICAL FIELD

The present disclosure relates to an enterprise knowledge management platform, and in particular to a system, method, and storage medium including executable computer programs for monitoring and optimizing the enterprise knowledge management platform including a work assistant search engine (WASE) using non-personally-identifiable information collected and stored in data logs received from customer deployments.

BACKGROUND

Employees of a company during work may use multiple software applications (including single-purpose apps) installed in a computing environment of the company. Each of the software applications when executed may perform certain functions (e.g., e-mail, messaging) related to the work and operation of the company. The execution of a software application may process input information and generate output data that may be stored in a storage space. The computing environment of the company may store the input information and the output data associated with a software application in a segment of the storage space (referred to as a "data repository"). Different data repositories may be established for different software applications to store their respective input information and output data.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
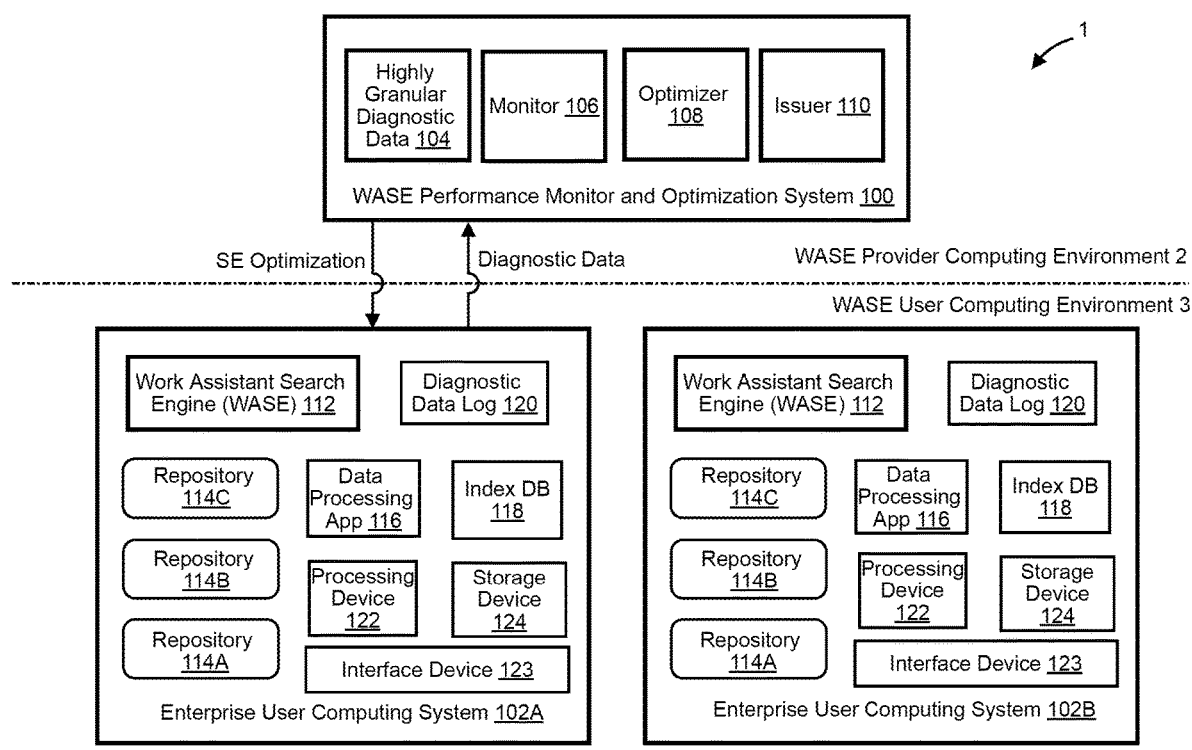
FIG. 1 illustrates a networked environment that includes systems for monitoring and optimizing work assistant search engines running within a secured enterprise computing environment according to an implementation of the disclosure.

The execution of the software applications may generate multiple data repositories that each may form a data silo that is separate from other data silos generated by other software applications. These data silos contain information or knowledge that may be needed by a user (e.g. an employee of the company). The user during work may run a software application and search for the information or knowledge from the data silo related to the software application. This search process may consume a large amount of time of the user when the information could possibly exist across multiple data silos, thus negatively impacting the work efficiency and performance of the user. To reduce the time consumed by the user spent on searching for information in data repositories and improve the user's work efficiency and performance, the company may install an enterprise knowledge management platform that may include a work assistant search engine (WASE) through which the user may quickly and efficiently determine the requested information and knowledge across multiple independent data repositories.

The enterprise knowledge management platform is a computing software application implemented to run on a processing device (e.g., CPU, GPU) or in a computing cloud (e.g., enterprise computing clouds) to achieve smart information storage and retrieval across the computing environment of the company. The enterprise knowledge management platform during operation may identify data repositories and their associated software applications, process the information stored in the data repositories to generate an index data structure, and allow the user to retrieve any information in the data repositories according to user queries to a work assistant search engine provided with the enterprise knowledge management platform. In response to a query, the search engine may return with search results ranked in accordance with certain relevancy criteria. In this way, the user may identify the useful information quickly and efficiently from multiple data repositories.

The public search engines (e.g., the Google search engine) for information available in the public domain may include crawling, indexing, and serving (and ranking) components. The crawling component ("crawler") is a software application that when executed, may search data points (e.g., web pages) through links (e.g., URLs to web pages) and retrieve the data points. The crawler may keep searching for and visiting new data points and/or updating to previously-visited data points to retrieve contents in these data points. The indexing component ("indexer") may analyze the contents of the data points retrieved by the crawler, and build an index database including indices relating to the data points. The contents of the data points may include text, image, graphic, and video documents. The indexer may analyze these documents to decipher meaningful information contained therein, and store metadata as data entries representing the meaningful information in the index database. When a user enters a query to a search engine, the serving component may calculate relevancy values between the query and data entries in the index database, and provide responses to the query in a user interface in certain forms such as a ranked list of hyperlinks to data points on the Internet, where the order of the ranked list is determined according to the relevancy values. The public search engines may further collect the user's selections (clicks) on the hyperlinks, and based on the selections, further improve the model used for calculating the relevancy values between the query and the data entries in the index database. The public search engines may also supplement the index database to include the user's selections of hyperlinks responsive to the query.

A public search engine provider may provide the search engine to the public users through a web site hosted by the public search engine provider company ("public search engine provider"). The data points crawled, indexed, and served by the publish search engine are typically available to the public users using a web browser without restrictions. Thus, the public search engine provider may acquire the firsthand information of the interactions between the users and the search engine, and monitor and optimize the performance of the public search engine based on the firsthand information.

In comparison to the public search engine, the work assistant search engine provided with the enterprise knowledge management platform is designed to search for information stored in data repositories associated with software applications of the company. The information may be privileged and confidential to the company in the sense that it is not available to the public or any other companies including the search engine provider. The enterprise knowledge management platform on the other hand is provided as a software application (e.g., stand-alone software application or a software as a service (SaaS)) by a third-party provider. The third-party provider in general does not have the direct and complete access to the privileged and confidential information of the user company or the user queries and responses to the queries. For these reasons, the third-party provider cannot monitor and optimize the work assistant search engine of the enterprise knowledge management platform in the same way as the public search engine provider. Therefore, there is a need for systems and methods for the third-party software provider to monitor and optimize the enterprise knowledge management platform with limited information without direct and complete access to the data sources of the company. In some implementations, the limited information is non-personally-identifiable information or without revealing the identity of the users and their intentions with respect to the work assistant search engine.

Implementations of the disclosure may provide a system for monitoring and optimizing work assistant search engines. The system may be implemented in a search engine provider computing environment that is securely separated from the search engine user computing environment. Thus, the search engine user computing environment is safe from the intrusion from the search engine provider computing environment. In one implementation, the system may include a storage device and one or more processing devices to receive diagnostic data of a work assistant search engine from a secured enterprise computing system, the diagnostic data including features calculated based on a query directed to the work assistant search engine, an identifier of a user requesting the query, and one or more documents retrieved based on the query, and relevancy scores (also referred to as "feature values") of the one or more documents with respect to the query, as well as user interactions with research results (examples of user interactions including user's selections of documents through clicks on the links in the ranked list presented as the search results, the clicks including types of clicks such as a CLICK, a RIGHT-CLICK, a SHARE, or a COPY of a link), where the diagnostic data are an abstraction layer derived from the user identification information, contents of queries and the search results (e.g., a ranked list of links to documents) to the queries, where the abstraction layer is devoid of personal identification information of the user, the contents of the query, or contents of documents discovered in the search results; determine, by analyzing the diagnostic data, a search quality metric value; responsive to determining that the search quality metric value differs from a target search quality metric value by a predetermined threshold value, determine an updated score model; and provide the updated score model to the secured enterprise computing system to update the work assistant search engine.

Correspondingly, in the search engine user computing environment, implementations of the disclosure may provide an enterprise knowledge management system including a work assistant search engine. The enterprise knowledge management system may include a storage space, an interface device, and one or more processing devices to execute a work assistant search engine that responsive to receiving a query submitted by a user, calculates features based on the query, an identifier of the user, and a plurality documents, and calculate relevancy scores of the documents with respect to the query; determine a subset of the plurality of documents and a subset features and relevancy scores associated with the subset of documents; store the subset features and relevancy scores, as well as user interactions with research results as diagnostic data of the work assistant search engine in a logging database; and export the diagnostic data to a second system for monitoring and optimizing work assistant search engines.

In this way, implementations of the disclosure provide technical solutions that may allow a software provider to monitor and optimize the work assistant search engine running within a user computing environment of a company without intruding on the user computing environment. FIG. 1 illustrates a networked environment 1 that includes systems for monitoring and optimizing work assistant search engines running within a secured enterprise computing environment according to an implementation of the disclosure. Referring to FIG. 1, environment 1 may be partitioned into a work assistant search engine (WASE) provider computing environment 2 and a WASE user computing environment 3, where the WASE user computing environment 3 may be securely separated from the WASE provider computing environment 2 in the sense that the WASE provider computing environment 2 does not have full or any access to the user-privileged information in the WASE user computing environment 3.

A WASE provider can be a software vendor that sells enterprise knowledge management platforms each including a respective work assistant search engine to user enterprise companies. These enterprise companies may install enterprise knowledge management platforms in their computing systems to enable quick and accurate knowledge search and retrieval. Referring to FIG. 1, WASE user computing environment 3 may include one or more enterprise user computing systems 102A, 102B. Each of enterprise user computing systems 102A, 102B may be secured from other enterprise user computing systems and the WASE provider computing environment 2.

In some implementations, an enterprise user computing system 102A, 102B may include hardware processing device 122, an interface device 123, and a storage device 124, where the storage device 124 and the interface device 123 are communicatively coupled to processing device 122 by an internal network.

Processing device 122 can be a hardware processor such as a central processing unit (CPU), a graphic processing unit (GPU), an accelerator circuit, or a computing resource in a cloud. Interface device 123 can be a display such as a touch screen of a desktop, laptop, or smart phone. Storage device 124 can be a memory device or a hard disc connected to processing device 122 through a network interface card (not shown). In some implementations, processing device 122, interface device 123, and storage device 124 are computing resources made available through a computing cloud.

Processing device 122 can be a programmable device that may be programmed to run software applications (e.g., e-mail applications (Outlook, Gmail), business messaging applications (Slack, Team), document generation applications (MS Word, Google Docs), document sharing applications (OneDrive, Dropbox), audio/video conference applications (Zoom, Skype, WebEx), any suitable software applications). Employees may use any one of these software applications to process input information and generate output documents (e.g., e-mails, streams of text conversations, edited documents, recordings of conference calls). These software applications may store the input information and output documents in their corresponding data repositories 114A-114C. In some implementations, each software application may store its data in its own data repository 114A-114C, and each data repository 114A-114C may occupy a separate segment in storage device 124. Thus, it is inconvenient for a user to search for information across these disjoint data repositories (or silos of data) without a work assistant search engine.

In an implementation of the disclosure, enterprise user computing system 102A, 102B may implement and run a work assistant search engine 112 that may be used by a user to search documents (or certain contents in the documents) stored in data repositories 114A-114C based on queries entered by the user. The work assistant search engine 112 may include search engine interface components for entering queries and displaying search results. The search results can be links (e.g., Uniform Resource Locators (URLs) and/or URLs along with a short synopsis of contents relating to the query). Further, the work assistant search engine 112 may include a search engine application that may determine the relevancy values of documents stored in data repositories 114A-114C with respect to the user and the query entered by the user, and present a ranked list of links to certain documents along with a short synopsis of the relevant content in the search engine interface with rankings based on the relevancy values, where the links can be paths to the locations that store the documents. To assist operations of the work assistant search engine 112, enterprise user computing system 102 may also implement data processing applications 116 and index database 118.

In one implementation, data processing applications 116 may include content connectors that may convert unstructured data items (d) stored in data repositories 114A-114C into indexed data structures stored in index database 118, and identity connectors that may convert different user identifiers associated with different data repositories 114A-114C into search engine user identifiers so that each unique user is associated with a unique search engine user identifier (U). The search engine application may then calculate the relevancy values for each query with respect to the data items (d) and the user identifier (U).

In one implementation, data processing applications 116 may further record the user interactions with the search results, calculate feature values associated with the search results displayed in the search engine user interface, and store diagnostic data of the search engine performance in the diagnostic data log 120. The diagnostic data may be calculated and stored at a highly-granular or coarse level so that when they are exported to performance and optimization system 100, the diagnostic data do not contain privileged information (e.g., user personal identification information such as names and birthdates or confidential business information, contents of the queries, or contents of the retrieved documents) or redundant information that is irrelevant to the performance monitoring and optimization.

Figure 2:
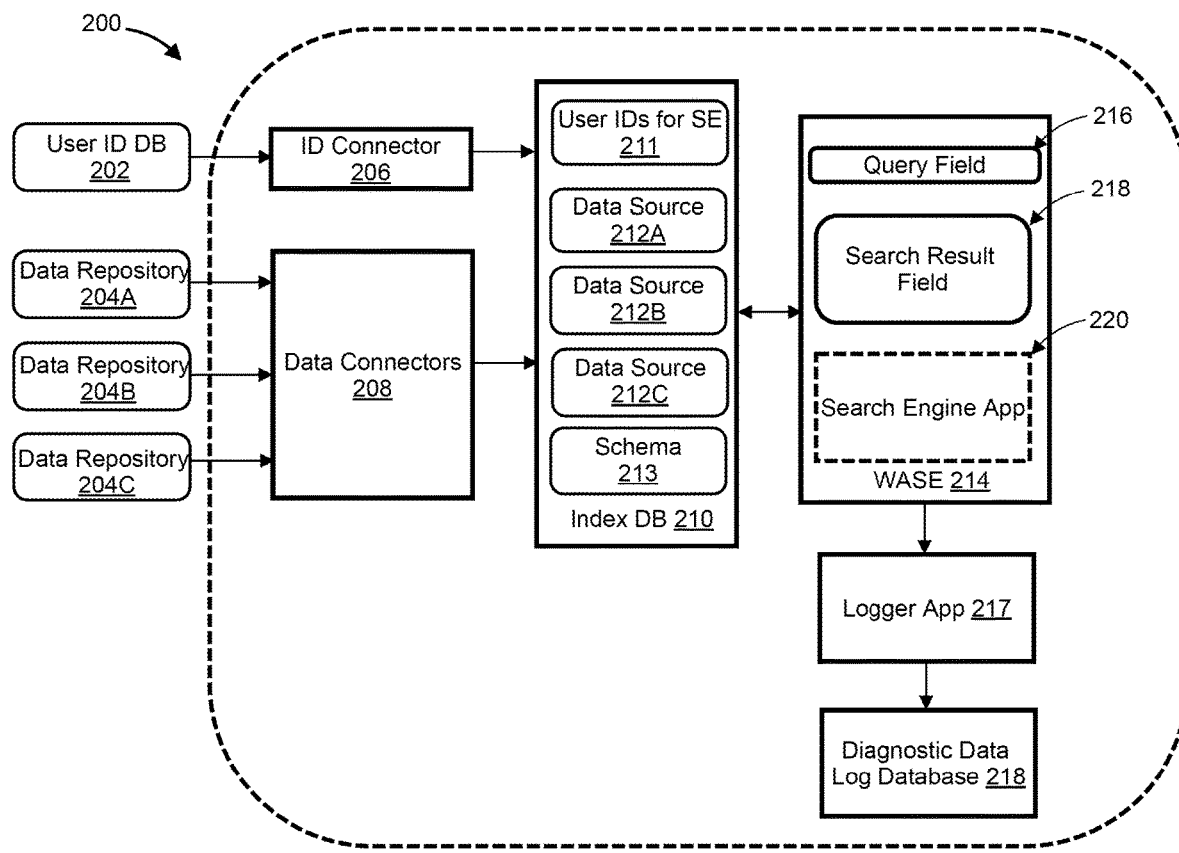
FIG. 2 illustrates a system including components of a work assistant search engine and its diagnostic recording according to an implementation of the disclosure.

FIG. 2 illustrates a system 200 including components of a work assistant search engine and its diagnostic recording according to an implementation of the disclosure. Referring to FIG. 2, system 200 can be part of enterprise user computing system 102A, 102B, and may include user identifier database 202, data repositories 204A-204C, an identity connector 206, data connectors 208, index database 210 containing data sources 212A-212C and schema 212D, a work assistant search engine (WASE) 214 including search engine interface elements of query field 216 and search result field 218 and a search engine application 220, a logger application 217, and a diagnostic data log database 218.

In one implementation, each data repository 204A-204C may be associated with or include a corresponding software application (e.g., e-mail application, message collaboration application) that may record documents in the data repository. The documents include files (or segments of files), directories containing files, streams of conversations associated with a topic, and any searchable content. The documents may be in the form of text, audio, video, or any media formats. Each data repository 204A-204C may assign a same user a respective user identifier (e.g., dr_uid_a for 204A, dr_uid_b for 204B, dr_uid_c for 204C). These application-specific user identifiers may be stored in the user identifier database 202. Further, the documents stored in data repositories 204A-204C may be in the native forms of their corresponding software applications which may not be in a structured form suitable for a search engine application. To overcome the multiplicity of user identifiers stored in user identifier database 202 and unstructured forms of documents stored in data repositories 204A-204C, system 200 may include connectors 206, 208 to convert the user identifiers and documents into formats suitable for further processing by the work assistant search engine 214.

A connector is a custom software application (or program) that may convert data files into indexed formats that are suitable for a search engine application to match the data files with queries to the search engine. Connectors can run as separate programs or part of database applications (e.g., user identifier database 202, data repositories 204A-204C). In one implementation, system 200 may include identifier connector 206 that when running, may convert user identifiers associated with different data repositories 204A-204C and their corresponding software applications into a unique user identifier (U) for a same user. This unique user identifier (U) associated with a user can be used by search engine application 220 to calculate relevancy values between queries and documents.

System 200 may further include data connectors (or content connectors) 208 that may include custom programs to convert the unstructured documents stored in data repositories 204A-204C into searchable data objects organized as data sources 212A-212C stored in the index database 210. Each data repository 204A-204C may be coupled to a corresponding data connector 208 to convert the content of the data repository. In one implementation, the data objects are in forms defined according to schema 213 that is a data structure defined in a lightweight data-interchange format (e.g., JSON). Schema 213 can define the data objects and their properties as well as options to be used in indexing and querying the data. Thus, data connectors 208 may read content of data repositories 204A-204C, convert the content into structured data objects in accordance with schema 213, and store the data objects in data sources 212A-212C in index database 210. Data connectors 208 may run to update the data objects in data sources 212A-212C according to index calls. The index calls may be generated according to a schedule (e.g., periodically) or according to events (e.g., content updates in data repositories 204A-204C, updates of schema 213).

Work assistant search engine 214 may include user interface elements including a query field 216 for user to enter a query and a search result field 218 for displaying search results. Work assistant search engine 214 may also include a search engine application 220 that may perform calculations relating to search. In one implementation, responsive to receiving a query (e.g., a natural language sentence) entered at query field 216, search engine application 220 may first preprocess the query. The preprocessing of the query may include expansion of the query. A query may be composed of a string of terms (e.g., words). The expansion of the query may include addition of equivalents (e.g., synonyms) of these terms to the query. The expansion of the query may help improve the search quality.

Search engine application 220 may calculate relevancy values between the query and data objects in data sources 212A-212C with respect to the user that enters the query. A relevancy value $S(d, Q, U)$ represents the probability that a data object (d) is relevant to query (Q) with respect to a user (U). In one implementation, the relevancy value $S(d, Q, U)$ may be composed of two primary components including a topicality score $S\_T(d, Q, U)$ and a popularity score $S\_P(d, U)$, where the topicality score represents the relevance of the search result to the query and the popularity score represents the user's affinity to a data object (or document represented by the data object). The relevancy value $S(d, Q, U)$ may be calculated as a value proportional to the product of topicality score $S\_T(d, Q, U)$ and popularity score $S\_P(d, U)$. In one implementation, each one of topicality score $S\_T(d, Q, U)$ and popularity score $S\_P(d, U)$ is in a range between 0 and 1, thus the relevancy value $S(d, Q, U)$ also being the range between 0 and 1.

The topicality score $S\_T(d, Q, U)$ can be calculated as a function of topicality features, and the popularity score $S\_P(d, U)$ can be calculated as a function of popularity features. The popularity score is also referred to as the non-topicality score in certain contexts. A query may be composed of one or more query terms (e.g., "How to calculate the topicality features in search?"). Each useful query term (e.g., "calculate," "topicality," "topicality features," "search") may be used to calculate a corresponding topicality feature value which may be determined based on factors including the importance of a query term (e.g., whether the query term appears in the title, headings, or the body of the corresponding documents represented by data objects), hit frequencies (e.g., the number of times the query term appears in the document), user search histories (e.g., whether other users have searched for documents using the query term), term-hit counts across various attributes of the documents (e.g., attributes of title, body, anchors, headers, metadata), and weights assigned to query terms and their synonyms.

The popularity features may be specified based on the user's behavior with respect to a document including factors such as: whether the user visited the document before, the time at which the user visited the document, whether the user is the author of the document, whether other users with close working relation (e.g., in the same working group) visited the document and how often they visited, how long ago the document had been created, when the document was updated, etc. The popularity features capture the relationship with different documents, and are quantified in numerical values. In one implementation, the popularity score may be calculated based on a model that may combine these topicality features. The model can be a parameterized curve-fitting model, a logistic regression model, or a machine learning model including a neural network model that may be learned from training data. The model may be characterized by a set of parameters that might have been previously determined in a training processing using training data. The type of the model and its parameters may determine the calculation of the popularity score and therefore, the quality of the search results.

Both the topicality score function $S\_T(d, Q, U)$ and the popularity score function $S\_P(d, U)$ can be updated based factors relating to these two functions. In one implementation of the disclosure, the topicality score function $S\_T(d, Q, U)$ can be a probability value function whose output is determined based on many factors. These factors may include the length of a query (e.g., number of words in a query), the length of a document, relations among documents (e.g., an anchor document to other documents), and bounds to the output value, weights assigned to these factors. In one implementation, a penalty weight may be assigned according to a word ratio factor or how many words in a query are matched to the title of a document with respect to the length of the title. The penalty weight can be calculated as the number of matched words between a query and a title over the length of the title. The penalty weight is higher if the title is longer when the numbers of matched words are identical. Similarly, another penalty weight can be calculated as the number of matched words between a query and a document over the length of the document. The factors may also include temporal considerations between the query and the document. For example, the time of entering a query may be compared with the time at which a document was last updated. A higher contribution weight may be assigned to a more recently updated document when calculating topicality score. The word ratio factors and the temporal factors do not reveal confidential information (e.g., personally-identifiable information). Therefore, the topicality score function $S\_T(d, Q, U)$ can be updated based on non-personally-identifiable information such as the word ratio factors and the temporal factors.

In one implementation, the popularity score function $S\_P(d, U)$ can also be another probability value function whose output is determined based on two components. The first component can be an affinity component or a user's affinity to a datasource. The affinity component can be varied based on the hierarchy of a company (e.g., company level, department level, or user level) or a combination of different levels modified by corresponding weights (which can be prior values). The second component represents a measurement incorporating multiple signals between a document and a datasource. Each signal may be determined based on a data-driven model customized to a particular datasource. For example, a messaging datasource (e.g., Slack) may have a different data-driven model than a document datasource (e.g., Google Drive). The signals may include, but not limited to, deprecation signal, staleness signal, visits-affinity signal, and scaled popularity signal. The deprecation signal can be a Boolean value ("Deprecated" or "Not Deprecated") associated with a document indicating whether the corresponding document is deprecated or not. A deprecated document may contribute little or none to the second component value. The staleness signal may represent the current time and the time a document last updated. A more recent document may contribute more to the second factor. The visits-affinity signal is an attribute value calculated based on user's visits to a document. The scaled popularity signal is an attribute value calculated based department-level activity data and anchor data with respect to a document. Both the first component and the second component of the popularity score function S_P(d, U) can be adjusted based non-personally-identifiable information or in a manner without revealing privileged information of the user and the company. Thus, the popularity score function S_P(d, U) can also be updated based on non-personally-identifiable information such as the affinity and the above-identified signals.

Responsive to obtaining a query including query terms entered by a user (U) at query field 216, search engine application 220 may first perform preprocessing operations and then operations to determine the relevancy value S(d, Q, U). The determination of the S(d, Q, U) may include calculating topicality features and calculating the topicality score S_T(d, Q, U) for each document (d) stored in data repositories 204A-204C (through data objects stored in data sources 212A-212C) based on the calculated topicality features, calculating the popularity features based on the model and the popularity score S_P(d, U) for each document (d), and calculating the relevancy value S(d, Q, U) as a product of the topicality score S_T(d, Q, U) and the popularity score S_P(d, U) for each document (d). Search engine application 220 may further compare the relevancy values for different documents and present a ranked list of links to these documents in search result field 218. The order of presentation of the list may be based on the relevancy values (e.g., higher relevancy values mean higher locations on the ranked list). In this way, a user may quickly and accurately locate useful information in documents stored in data repositories 204A-204C.

The work assistant search engine 214 may be provided by a third-party software provider to the user company. Often, the work assistant search engine provider may desire to monitor the quality of the search results during its use and, further based on a determination that the quality deviates from a tolerance range, adjust the parameters of work assistant search engine 214. To this end, system 200 may further include a logger application 217 to record diagnostic data in diagnostic data database 218. The logger application 217 can be part of the work assistant search engine 214 or can be a software add-on to but separate from the work assistant search engine 214. To achieve data security of the user computing system and efficient monitoring of the work assistant search engine 214, logger application 217 may record the diagnostic data in a highly-granular fashion.

In one implementation, logger application 217 may record user activities including the user identifier, the query entered by the user, the search results, and the user selection of documents linked to by the search results. In particular, logger application 217 may record the query entered by a user and the user information. To achieve data security, logger application 217 may remove personal identification information (PII) of the user or any other users. The personal identification information may include the names, job titles, birthdates, e-mails, phone numbers of these users. Thus, logger application 217 may substitute personal identification information with system-assigned user identifiers, and record user activities without any personal identification information of any user. Logger application 217 may also remove any confidential and/or proprietary information of the company.

In response to user entering a query, search engine application 220 of work assistant search engine 214 may calculate topicality features and topicality scores, popularity features and popularity scores, and relevancy values of documents with respect to the user query based on the topicality scores and the popularity scores. The work assistant search engine 214 may display the search results as a ranked list in search result field 218. Logger application 217 may further record the features values (both topicality features and popularity features) associated with the search results. The feature values may be at a highly-granular level that is abstracted from the underlying documents and query, thus allowing monitoring the search quality without disclosing substantive search information. In one implementation, to further reduce the amount data recorded, logger application 217 may record the feature values of a subset of the search results rather than the full set. For example, logger application 217 may record a top N search results, where N is an integer value determined based on the limitation of the diagnostic data size. N can be much smaller than the total number of search results.

Logger application 217 may further record information about user's interactions with the search results displayed in the search result field 220. The user's activities may include the activation (e.g., the activities including a click on a link and the types of the click) of a document, share/copy of a document/the link to the document, like of a document, etc. These recorded activities are also useful for monitoring the search quality and optimizing the search engine application 220.

Logger application 217 may record these data as the diagnostic data in log database 218. The diagnostic data may include the feature values, scores, and user activities. The diagnostic data may also include factors contributed to the topicality score function calculation (e.g., word ratio factor and temporal factor) and components contributed to the popularity score function calculation (e.g., affinity and signals). The diagnostic data, however, are an abstraction layer that excludes the personally-identifiable information of the user, the content of queries, or the contents of the documents, thus preventing the privileged information in the enterprise user computing systems from leaking. Logger application 217 may export the diagnostic data to the work assistant search engine (WASE) performance monitor and optimization system 100 through a communication network as shown in FIG. 1. The WASE performance monitor and optimization system 100 may be situated in the WASE provider computing environment 2 that is securely separated from the WASE user computing environment 3.

Referring to FIG. 1, the WASE performance monitor and optimization system 100 may include a storage to receive and store the high-granular diagnostic data 104 received from enterprise user computing systems 102A, 102B, a monitor component 106 running on a processing device for monitoring the search result quality, an optimizer component 108 running on the processing device for determining improvements to the work assistant search engine, and an issuer component 110 for transmitting updates to the work assistant search engine 112 of enterprise user computing system 102A, 102B. In one implementation, the WASE performance monitor and optimization system 100 may receive diagnostic data of a single enterprise user computing system 102A or 102B, and perform monitoring and optimization on the enterprise user computing system. In other implementations, the WASE performance monitor and optimization system 100 may receive diagnostic data 104 from more than one enterprise user computing systems 102A, 102B, and perform monitoring and optimization on these enterprise user computing systems. As discussed above, the received diagnostic data are highly-granular, including corresponding feature values derived from queries, certain user information, and a subset of search results as well as user interactions with the subset of search results. The received diagnostic data 104, however, do not contain privileged information such as user personal information, the contents of the queries, or the contents of the documents related to the queries. The received diagnostic data 104 may be used for analyzing the performance of the work assistant search engine 112 installed in enterprise user computing system 102A, 102B.

Monitor component 106 may include program code executed by a processing device to monitor the quality of different features (including topicality features and popularity features) and corresponding scores (including topicality scores and popularity scores). In one implementation, monitor component 106 may keep a record of the feature values over time, thus storing a time series of the feature values. Further, monitor component 106 may further calculate statistics values of the feature values over time. The statistics values may include descriptive statistics values such as the mean or standard deviations that may characterize the variability of the feature values over time. Monitor component 106 may monitor the statistics values associated with the feature values over time to determine whether the work assistant search engine operates normally. Responsive to determining that the statistics values associated with the feature values over time reflect a significant change from the norm, monitor component 106 may determine that the work assistant search engine operates in a deteriorating state and may need maintenance. In one implementation, monitor component 106 may determine that a significant change happens when the statistics values exceed a tolerance range of a historical norm of the statistics values. In one implementation, the historical norm is determined based on the feature values from a single enterprise user computing system 102A, 102B. In another implementation, the historical norm is determined based on the feature values received from multiple enterprise user computing systems 102A, 102B. In this way, the highly-granular diagnostic data 104 received from enterprise user computing systems 102A, 102B may be used to monitor the performance of work assistance search engines 112 therein.

In addition to monitoring the performance of work assistance search engine 112, WASE performance monitor and optimization system 100 may include an optimizer 108 that may adjust the model and parameters employed by the search engine application, thus upgrading and improving the performance of the search engine. In one implementation, optimizer 108 may include a simulator that may simulate the calculation of topicality scores and/or the popularity scores by applying different score functions to the diagnostic data 104. The simulation may include adjusting parameters of a score function and/or applying different forms of score functions. The adjustments may include update the topicality score function model and the popularity score function. For a score function that is currently being deployed, the simulation may adjust the parameters of the score function (e.g., adjusting the weight values of a weighted average score function), thus changing the calculation of the topicality score and the popularity score and eventually the relevancy values between documents and a query. In some implementations, the simulation may include experimenting with different forms of score functions (e.g., weighted average of feature values, non-linear functions of feature values, or neural network models), thus also changing the calculation of the topicality score and the popularity score and eventually the relevancy values between documents and a query. The simulation may produce a simulated ranked list that may be compared with the user click history to determine whether the score functions in the simulation improve the relevancy calculation. For example, the simulation may determine whether a score function A ranks a clicked document higher than, lower than, or the same as a score function B.

In one implementation, the simulation may train a machine learning model to calculate the topicality score and/or popularity score. The machine learning model may include a multi-layered neural network model. In a forward propagation of the training process, an input layer may receive the diagnostic data 104 which may be propagated through calculation layers of the neural network to produce relevancy scores for documents. The relevancy scores of documents may be compared with the click history of these documents to determine a simulation performance improvement. The simulation performance improvement may be used in a backward propagation to adjust the parameters of the calculation layers in a way to maximize the simulation performance improvement. The neural network may be trained and ready to be deployed when the simulation error is converged within a tolerance range.

In one implementation, monitor 106 may detect that the performance of the work assistant search engine deviates from a norm and notify optimizer 108 about the deviation. Responsive to receiving the notification from monitor 106, optimizer 108 may run simulations to determine score functions that may improve the relevancy values. Responsive to determining optimized score functions, issuer 110 may transmit a work assistant search engine the optimized score functions to enterprise user computing system 102A, 102B in a software update package. Enterprise user computing system 102A, 102B may update work assistant search engine 112 by installing the software update package including the optimized score function.

Figure 3:
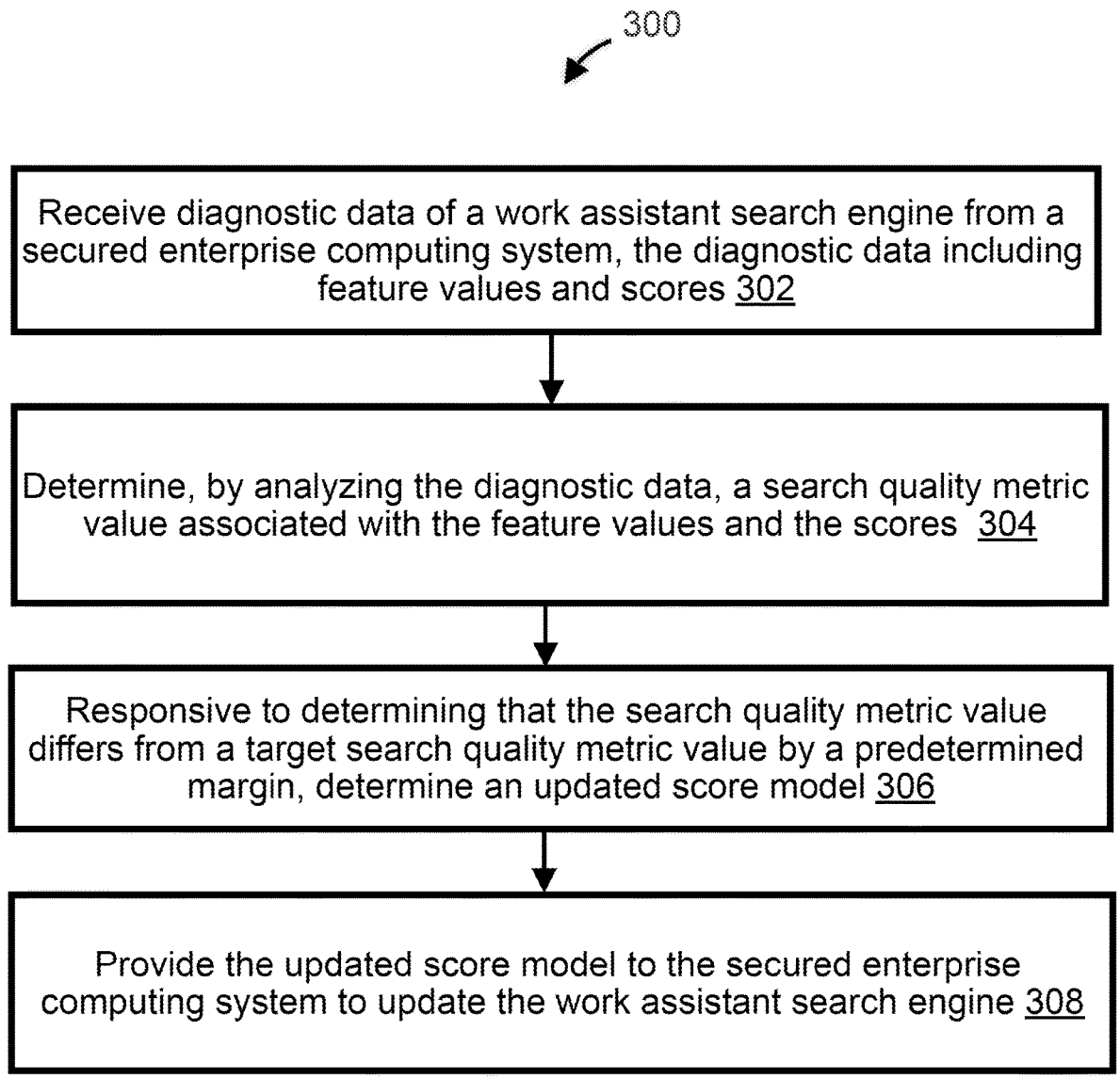
FIG. 3 illustrates a flowchart of a method for monitoring and optimizing work assistant search engines implemented within secured enterprise computing systems according to an implementation of the disclosure.

FIG. 3 illustrates a flowchart of a method 300 for monitoring and optimizing work assistant search engines implemented within secured enterprise computing systems according to an implementation of the disclosure. Method 300 may be performed by processing devices that may comprise hardware (e.g., circuitry, dedicated logic), computer readable instructions (e.g., run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by one or more processing devices in the WASE performance monitor and optimization system 100 in FIG. 1.

As shown in FIG. 3, the one or more processing devices may, at 302, receive diagnostic data of a work assistant search engine from a secured enterprise computing system, the diagnostic data including feature values and scores, where the feature values are calculated based on a query, an identifier of a user requesting the query, and data objects representing documents identified by the work assistant search engine responsive to the query, and where the scores are calculated by applying a score model to the feature values.

At 304, the one or more processing devices may determine, by analyzing the diagnostic data, a search quality metric value associated with the feature values and the scores.

At 306, the one or more processing devices may, responsive to determining that the search quality metric value differs from a target search quality metric value by a predetermined threshold value, determining an updated score model.

At 308, the one or more processing devices may provide the updated score model to the secured enterprise computing system to update the work assistant search engine.

Figure 4:
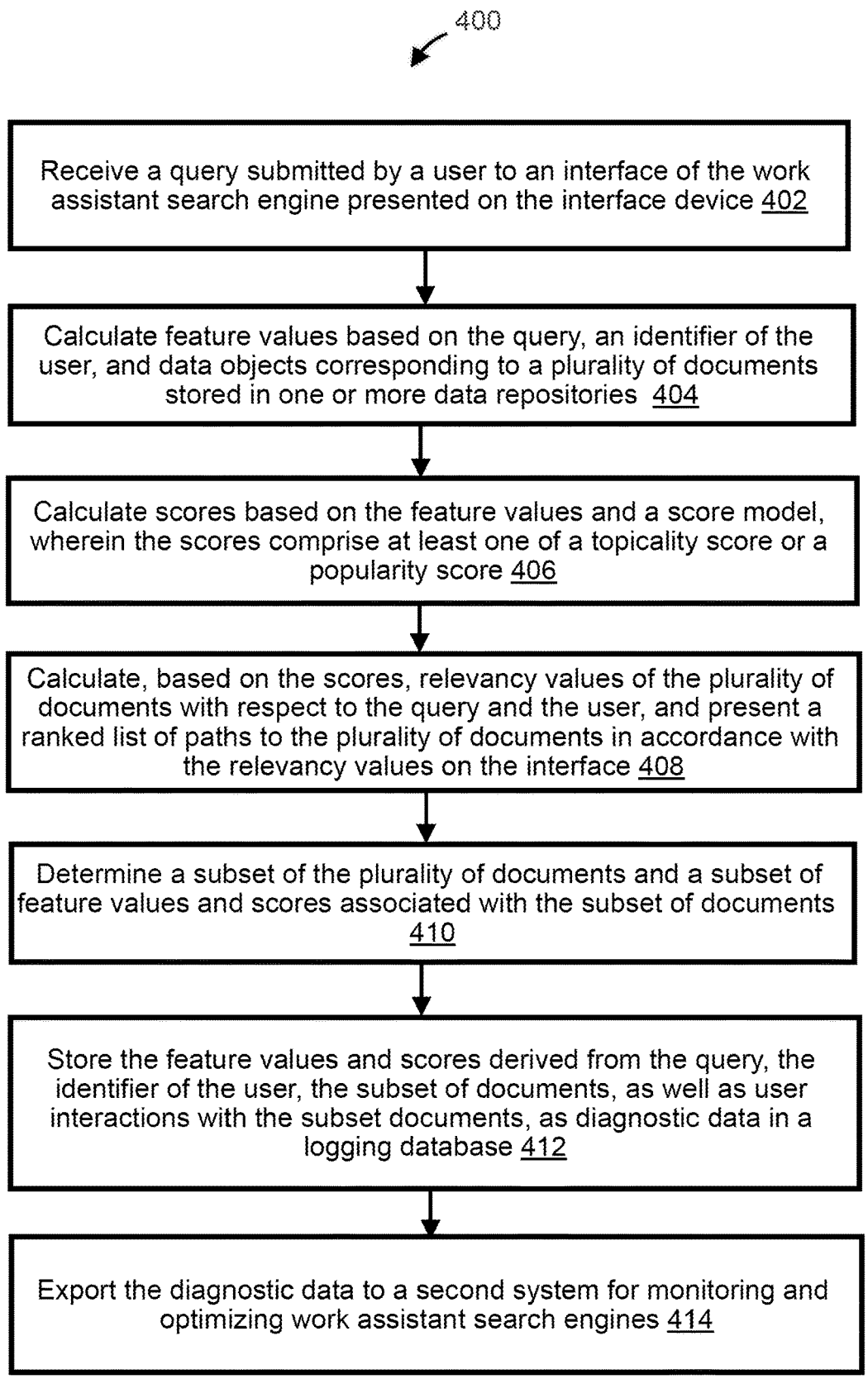
FIG. 4 illustrates a flowchart of a method for operating work assistant search engines implemented within secured enterprise computing systems according to an implementation of the disclosure.

FIG. 4 illustrates a flowchart of a method 400 for operating work assistant search engines implemented within secured enterprise computing systems according to an implementation of the disclosure. An enterprise computing system may include a processing device (e.g., processing device 112 as shown in FIG. 1). The processing device 112 may, at 402, receive a query submitted by a user to an interface of the work assistant search engine presented on the interface device.

At 404, the processing device 112 may calculate feature values based on the query, an identifier of the user, and data objects corresponding to a plurality of documents stored in one or more data repositories.

At 406, the processing device 112 may calculate scores based on the feature values and a score model, where the scores comprise at least one of a topicality score or a popularity score.

At 408, the processing device 112 may calculate, based on the scores, relevancy values of the plurality of documents with respect to the query and the user, and present a ranked list of paths to the plurality of documents in accordance with the relevancy values on the interface. In some implementation, processing device 112 may perform steps 406 and 408 together to calculate the relevancy values of the plurality of documents directly from the topicality scores and popularity scores.

At 410, the processing device 112 may determine a subset of the plurality of documents and a subset of feature values and scores associated with the subset of documents.

At 412, the processing device 112 may store the feature values and scores derived from the query, the identifier of the user, the subset of documents, as well as user interactions with the subset documents, as diagnostic data in a logging database.

At 414, the processing device 112 may export the diagnostic data to a second system for monitoring and optimizing work assistant search engines.

Figure 5:
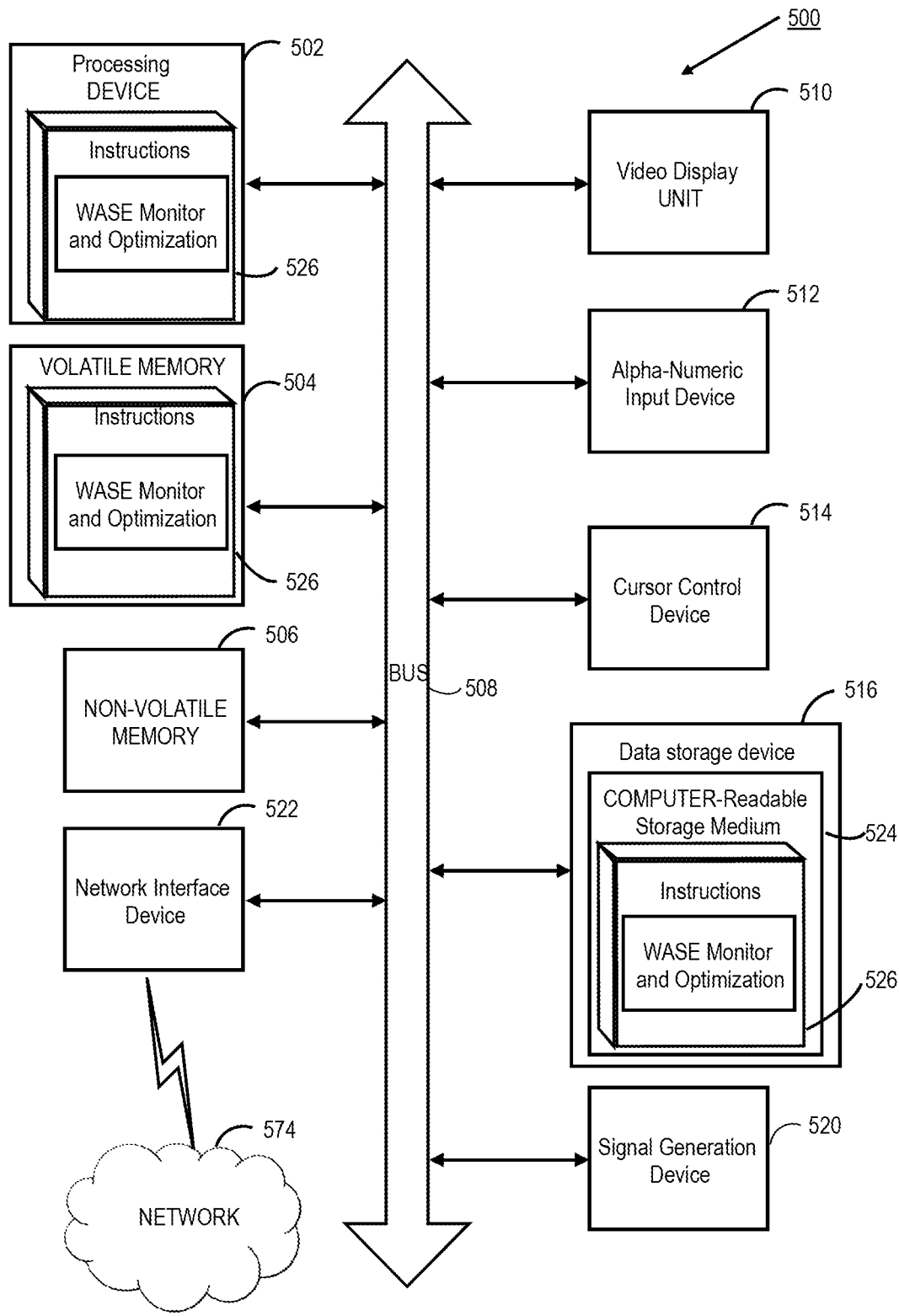
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to the enterprise user computing systems 102A, 102B and WASE performance monitor and optimization system 100 as shown in FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 and 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system for monitoring and optimizing work assistant search engines that are implemented within secured enterprise user computing systems, comprising:
a storage device; and
one or more processing devices, communicatively connected to the storage device, to:
receive diagnostic data of a work assistant search engine from a secured enterprise user computing system, the diagnostic data comprising feature values and scores, wherein the secured enterprise user computing system is safe from transmitting non-diagnostic data to the system, wherein the feature values are an abstract layer calculated based on a query, an identifier of a user requesting the query, and data objects representing documents identified by the work assistant search engine responsive to the query, and the abstract layer is devoid of personal information of the user or content of the documents identified by the work assistant search engine, and wherein the scores are calculated by applying a score model to the feature values;
determine, by analyzing the diagnostic data, a search quality metric value associated with the feature values and the scores;
responsive to determining that the search quality metric value differs from a target search quality metric value by a predetermined threshold value, determine an updated score model; and
provide the updated score model to the secured enterprise user computing system to update the work assistant search engine.

2. The system of claim 1, wherein the scores comprise at least one of a topicality score that is determined based on one or more feature values relating to the query, the identifier of the user requesting the query, and the data objects representing documents identified by the work assistant search engine responsive to the query, or a popularity score that is determined based on one or more feature values relating to the identifier of the user requesting the query and the data objects representing documents identified by the work assistant search engine responsive to the query.

3. The system of claim 1, wherein to determine, by analyzing the diagnostic data, a search quality metric value associated with the feature values and the scores, the one or more processing devices are further to:
record the feature values over time;
calculate a statistics value of the feature values over time; and
determine the search quality metric value associated with the feature values and the scores based on the statistics value.

4. The system of claim 1, wherein the diagnostic data further comprises:
a history of user interactions associated with the documents identified by the work assistant search engine responsive to the query,
at least one factor value for calculating a topicality feature value, wherein the at least one factor value comprises at least one of a word ratio factor or a temporal factor between the query and a corresponding data object representing a document, and
an affinity value and a signal for calculating a polarity feature value, wherein the affinity value representing an affinity relation between a user and a corresponding document, and the signal is at least of a deprecation signal, a staleness signal, a visits-affinity signal, or a scaled popularity signal, and
wherein the diagnostic data is devoid of personal information of the user, contents of the query, or contents of the documents, and wherein the user interactions comprise at least one of a click on a hyperlink associated with one of the documents or a type of the click.

5. The system of claim 4, wherein to determine an updated score model, the one or more processing devices are further to:
perform simulations by applying one or more updated score models to the feature values to calculate simulated scores, wherein the one or more updated score models are updated by varying functions for calculating the scores based on feature values, functions for calculating the topical feature value based on the at least one factor, or functions for calculating the popularity feature value based on the affinity value and the signal; and
determine the updated score model based on the user's activities.

6. The system of claim 5, wherein the updated score model comprises a neural network, and wherein the simulations comprise a training of the neural network.

7. The system of claim 1, wherein the feature values in the diagnostic data are fewer than a complete set of feature values determined by the work assistant search engine for data objects responsive to the query.

8. The system of claim 1, wherein the system is deployed in a software provider computing environment that is securely separate from the enterprise computing environment providing the work assistant search engine.

9. The system of claim 1, wherein the one or more processing devices are to receive the diagnostic data of more than one work assistant search engines from more than one secured enterprise user computing systems.

10. A method for monitoring and optimizing work assistant search engines that are implemented within secured enterprise user computing systems, the method comprising:
receiving, by one or more processing devices, diagnostic data of a work assistant search engine from a secured enterprise user computing system, the diagnostic data comprising feature values and scores, wherein the secured enterprise user computing system is safe from transmitting non-diagnostic data to the system, wherein the feature values are an abstract layer calculated based on a query, an identifier of a user requesting the query, and data objects representing documents identified by the work assistant search engine responsive to the query, and the abstract layer is devoid of personal information of the user or content of the documents identified by the work assistant search engine, and wherein the scores are calculated by applying a score model to the feature values;
determining, by analyzing the diagnostic data, a search quality metric value associated with the feature values and the scores;
responsive to determining that the search quality metric value differs from a target search quality metric value by a predetermined threshold value, determining an updated score model; and
providing the updated score model to the secured enterprise user computing system to update the work assistant search engine.

11. The method of claim 10, wherein the scores comprise at least one of a topicality score that is determined based on one or more feature values relating to the query, the identifier of the user requesting the query, and the data objects representing documents identified by the work assistant search engine responsive to the query, or a popularity score that is determined based on one or more feature values relating to the identifier of the user requesting the query and the data objects representing documents identified by the work assistant search engine responsive to the query.

12. The method of claim 10, wherein determining, by analyzing the diagnostic data, a search quality metric value associated with the feature values and the scores further comprises:
recording the feature values over time;
calculating a statistics value of the feature values over time; and
determining the search quality metric value associated with the feature values and the scores based on the statistics value.

13. The method of claim 10, wherein the diagnostic data further comprises:
a history of user interactions associated with the documents identified by the work assistant search engine responsive to the query,
at least one factor value for calculating a topicality feature value, wherein the at least one factor value comprises at least one of a word ratio factor or a temporal factor between the query and a corresponding data object representing a document, and
an affinity value and a signal for calculating a polarity feature value, wherein the affinity value representing an affinity relation between a user and a corresponding document, and the signal is at least of a deprecation signal, a staleness signal, a visits-affinity signal, or a scaled popularity signal, and
wherein the diagnostic data is devoid of personal information of the user, contents of the query, or contents of the documents, and wherein the user interactions comprise at least one of a click on a hyperlink associated with one of the documents or a type of the click.

14. The method of claim 13, wherein determining an updated score model further comprises:
performing simulations by applying one or more updated score models to the feature values to calculate simulated scores, wherein the one or more updated score models are updated by varying functions for calculating the scores based on feature values, functions for calculating the topical feature value based on the at least one factor, or functions for calculating the popularity feature value based on the affinity value and the signal; and
determining the updated score model based on the user's activities.

15. The method of claim 14, wherein the updated score model comprises a neural network, and wherein the simulations comprise a training of the neural network.

16. The method of claim 10, wherein the feature values in the diagnostic data are fewer than a complete set of feature values determined by the work assistant search engine for data objects responsive to the query.

17. An enterprise user knowledge management system implementing a work assistant search engine, comprising:
a storage space;
an interface device; and
one or more processing devices, communicatively connected to the storage device and the interface device, to:
receive a query submitted by a user to an interface of the work assistant search engine presented on the interface device, wherein the enterprise user knowledge management system is safe from transmitting non-diagnostic data to the system;
calculate feature values that are an abstract layer calculated based on the query, an identifier of the user, and data objects corresponding to a plurality of documents stored in one or more data repositories, wherein the abstract layer is devoid of personal information of the user or content of the documents identified by the work assistant search engine;
calculate scores based on the feature values and a score model, wherein the scores comprise at least one of a topicality score or a popularity score;
calculate, based on the scores, relevancy values of the plurality of documents with respect to the query and the user, and present a ranked list of paths to the plurality of documents in accordance with the relevancy values on the interface;

determine a subset of the plurality of documents and a subset of feature values and scores associated with the subset of documents;

store the subset of features and scores as diagnostic data in a logging database; and export the diagnostic data to a second system for monitoring and optimizing work assistant search engines.

18. The system of claim 17, wherein the one or more processing device are further to:

store a history of user interactions with one or more documents in the ranked list in the diagnostic data;

store at least one factor value for calculating a topicality feature value, wherein the at least one factor value comprises at least one of a word ratio factor or a temporal factor between the query and a corresponding data object representing a document, and in the diagnostic data;

store an affinity value and a signal for calculating a polarity feature value, wherein the affinity value representing an affinity relation between a user and a corresponding document, and the signal is at least of a deprecation signal, a staleness signal, a visits-affinity signal, or a scaled popularity signal; and export the diagnostic data comprising the history of user's activities to the second system.

19. The system of claim 18, wherein the second system comprises a processing device to:

receive the diagnostic data;

determine, by analyzing the diagnostic data, a search quality metric value associated with the feature values and the scores;

responsive to determining that the search quality metric value differs from a target search quality metric value by a predetermined threshold value, determine an updated score model; and provide the updated score model to the secured enterprise user computing system to update the work assistant search engine.

20. The system of claim 19, wherein to determine, by analyzing the diagnostic data, a search quality metric value associated with the feature values and the scores, the processing device of the second system is further to:

perform simulations by applying one or more updated score models to the feature values to calculate simulated scores;

calculate simulated relevancy values based on the simulated scores; and determine the updated score model based on comparing the simulated relevancy values with the user's activities.

* * * * *